United States Patent
Chuang et al.

(10) Patent No.: US 7,354,275 B2
(45) Date of Patent: Apr. 8, 2008

(54) GRAPHICS CARD CONNECTOR MODULE, AND MOTHERBOARD DEVICE HAVING THE SAME

(75) Inventors: Chien-Fa Chuang, Taipei Hsien (TW); Teng-Chang Su, Taipei Hsien (TW); Che-Yi Lin, Taipei Hsien (TW); Yu-Wen Li, Taipei Hsien (TW)

(73) Assignee: Micro-Star International Co., Ltd., Taipei Hsien (TW)

( * ) Notice: Subject to any disclaimer, the term of this patent is extended or adjusted under 35 U.S.C. 154(b) by 0 days.

(21) Appl. No.: 11/486,238

(22) Filed: Jul. 12, 2006

(65) Prior Publication Data

US 2007/0224844 A1    Sep. 27, 2007

(30) Foreign Application Priority Data

Mar. 23, 2006   (TW) ............................... 95110074 A

(51) Int. Cl.
*H01R 12/00* (2006.01)
(52) U.S. Cl. ........................... 439/65; 439/61; 439/74; 710/315
(58) Field of Classification Search .................. 439/61, 439/55, 65, 74; 361/760; 710/315
See application file for complete search history.

(56) References Cited

U.S. PATENT DOCUMENTS

| | | | | |
|---|---|---|---|---|
| 5,440,755 A | * | 8/1995 | Harwer et al. | 710/315 |
| 5,611,057 A | * | 3/1997 | Pecone et al. | 710/301 |
| 6,129,556 A | * | 10/2000 | Sihn et al. | 439/61 |
| 6,411,506 B1 | * | 6/2002 | Hipp et al. | 361/686 |
| 6,644,979 B2 | * | 11/2003 | Huang | 439/65 |
| 7,171,505 B2 | * | 1/2007 | Kuhlmann et al. | 710/305 |

* cited by examiner

*Primary Examiner*—Michael C. Zarroli
(74) *Attorney, Agent, or Firm*—Ladas & Parry, LLP

(57) ABSTRACT

The present invention relates to a graphics card connector module for being connected to a motherboard device, the motherboard including a primary slot coupling over N channels, said graphics card connector module comprising a first coupling connector adapted to be coupled to the primary slot of the motherboard; and a second coupling connector adapted to be connected electrically to a display device; the first coupling connector having a plurality of up to N conductive terminals adapted to be each electrically coupled to a corresponding one of the channels of the primary slot.

22 Claims, 3 Drawing Sheets

US 7,354,275 B2

GRAPHICS CARD CONNECTOR MODULE, AND MOTHERBOARD DEVICE HAVING THE SAME

CROSS-REFERENCE TO RELATED APPLICATION

This application claims priority of Taiwanese Application No. 095110074, filed on Mar. 23, 2006.

BACKGROUND OF THE INVENTION

1. Field of the Invention

The invention relates to a graphics card connector module, and a motherboard device having the same, more particularly to a graphics card connector module, and a motherboard device having the same adapted for use with at least one graphics card.

2. Description of the Related Art

Due to the requirements for a computer microprocessor with an increased operating speed and a wider frequency bandwidth, a Peripheral Component Interconnect (PCI) Express interface, which has a frequency bandwidth nearly twice that of a conventional PCI interface during upload or downward, has been proposed. A PCI-Express interface provides signal coupling over 2, 4, 8, 16 or 32 channels, and serves as a bus input interface for a graphics card.

Referring to FIG. 1, a conventional motherboard device 9 for a desktop computer is adapted for use with two graphics cards, and includes two PCI-Express slots 911, 912, each of which provides signal coupling over 16 channels (Channel 0~channel 15), a processing unit 92 that supports data processing compatible with a Scalable Link Interface (SLI) standard and that is connected electrically to the PCI-Express slots 911, 912, and a switching unit 93 connected electrically to the PCI-Express slots 911, 912 and the processing unit 92 and operable so as to switch between a single-card processing mode, where one of the PCI-Express slots 911, 912 (for example, the PCI-Express slot 911) can provide signal coupling over the 16 channels, and a two-card processing mode, where the PCI-Express slot 911 provides signal coupling over eight (for example, the channels 0~7) of the 16 channels and where the PCI-Express slot 912 provides signal coupling over the other eight (for example, the channels 8~15) of the 16 channels.

As such, when the switching unit 93 is switched to the single-card processing mode while the graphics card 81 is coupled electrically to the PCI-Express slot 911, the processing unit 92 supplies data to the graphics card 81 via the PCI-Express slot 911 for processing the data, and the graphics card 81 then outputs the processed data to a display device 7. On the other hand, when the switching unit 93 is switched to the two-card processing mode while the graphics cards 81, 82 are coupled electrically and respectively to the PCI-Express slots 911, 912, the processing unit 92 supplies data to the graphics cards 81, 82 via the channels 0~7 of the PCI-Express slot 911 and the channels 8~15 of the PCI-Express slot 912, respectively, and the processed data by the graphics cards 81, 82 is integrated and outputted to the display device 7, thereby resulting in an increased operating speed during image processing. It is noted that, for the two-card processing mode, an image frame displayed on the display device is divided into an upper frame portion 71 corresponding to the processed data from the graphics card 81, and a lower frame portion 72 corresponding to the processed data from the graphics card 82.

In such a configuration, the two PCI-Express slots 911, 912 and the switching unit 93 are required for the conventional motherboard device 9 for a desktop computer to enable operation in the two-card processing mode.

Although a graphics card connector for a conventional portable computer can provide signal coupling compatible with the Mobile PCI-Express Module (MXM) formats, such as MXM-I, MXM-II and MXM-III, and is coupled electrically to a small graphics card compatible with one of the MXM-I, MXM-II and MXM-III formats, the graphics card connector cannot be applied to the aforesaid conventional desktop computer because of lack of suitable converting interface.

SUMMARY OF THE INVENTION

Therefore, the object of the present invention is to provide a graphics card connector module, and a motherboard device having the same that has at least one graphics card connector so as to be adapted to be coupled to at least one graphics card and that is connected electrically to a single PCI-Express slot.

According to one aspect of the present invention, there is provided a graphics card connector module adapted for interconnecting a motherboard, a graphics card and a display device. The motherboard includes a primary slot that provides signal coupling compatible with the PCI-Express industry standard. The graphics card connector module comprises:

a card body;

a first coupling connector mounted on the card body and adapted to be coupled electrically to the primary slot of the motherboard;

a graphics card connector mounted on the card body, connected electrically to the first coupling connector, and adapted to be coupled electrically to the graphics card; and a second coupling connector mounted on the card body, connected electrically to the graphics card connector, and adapted to be connected electrically to the display device.

According to another aspect of the present invention, there is provided a graphics card connector module adapted for interconnecting a motherboard, first and second graphics cards and a display device. The motherboard includes a primary slot that provides signal coupling compatible with the PCI-Express industry standard. The graphics card connector module comprises:

a card body;

a first coupling connector mounted on the card body and adapted to be coupled electrically to the primary slot of the motherboard;

a master graphics card connector mounted on the card body, connected electrically to the first coupling connector, and adapted to be coupled electrically to the first graphics card;

a slave graphics card connector mounted on the card body, connected electrically to the first coupling connector, and adapted to be coupled electrically to the second graphics card; and a second coupling connector mounted on the card body, connected electrically to the master graphics card connector, and adapted to be connected electrically to the display device.

According to a further aspect of the present invention, a motherboard device comprises:

a circuit board;

a primary slot mounted on the circuit board and providing signal coupling compatible with the PCI-Express industry standard;

a processing unit mounted on the circuit board and connected electrically to the primary slot; and a graphics card connector module including a card body, a first coupling connector mounted on the card body and coupled electrically to the primary slot, a graphics card connector mounted on the card body, connected electrically to the first coupling connector, and adapted to be coupled electrically to a graphics card, and a second coupling connector mounted on the card body, connected electrically to the graphics card connector, and adapted to be connected electrically to a display device.

When the graphics card is coupled electrically to the graphics card connector, the processing unit is configured to supply data to the graphics card via the primary slot, and the first coupling connector and the graphics card connector of the graphics card connector module for processing the data. The data processed by the graphics card is outputted to the display device via the graphics card connector and the second coupling connector of the graphics card connector module.

According to still another aspect of the present invention, a motherboard device comprises:

a circuit board;

a primary slot mounted on the circuit board and providing signal coupling compatible with the PCI-Express industry standard;

a processing unit mounted on the circuit board and connected electrically to the primary slot; and a graphics card connector module including a card body, a first coupling connector mounted on the card body and coupled electrically to the primary slot, a master graphics card connector mounted on the card body, connected electrically to the first coupling connector, and adapted to be coupled electrically to a first graphics card, a slave graphics card connector mounted on the card body, connected electrically to the first coupling connector, and adapted to be coupled electrically to a second graphics card, and a second coupling connector mounted on the card body, connected electrically to the master graphics card connector, and adapted to be connected electrically to a display device.

When the first and second graphics cards are coupled electrically and respectively to the master and slave graphics card connectors, the processing unit is configured to supply data to the first and second graphics cards via the primary slot, and the first coupling connector and the master and slave graphics card connectors of the graphics card connector module for processing the data. The data processed by the first and second graphics cards is outputted to the display device via the master graphics card connector and the second coupling connector of the graphics card connector module.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
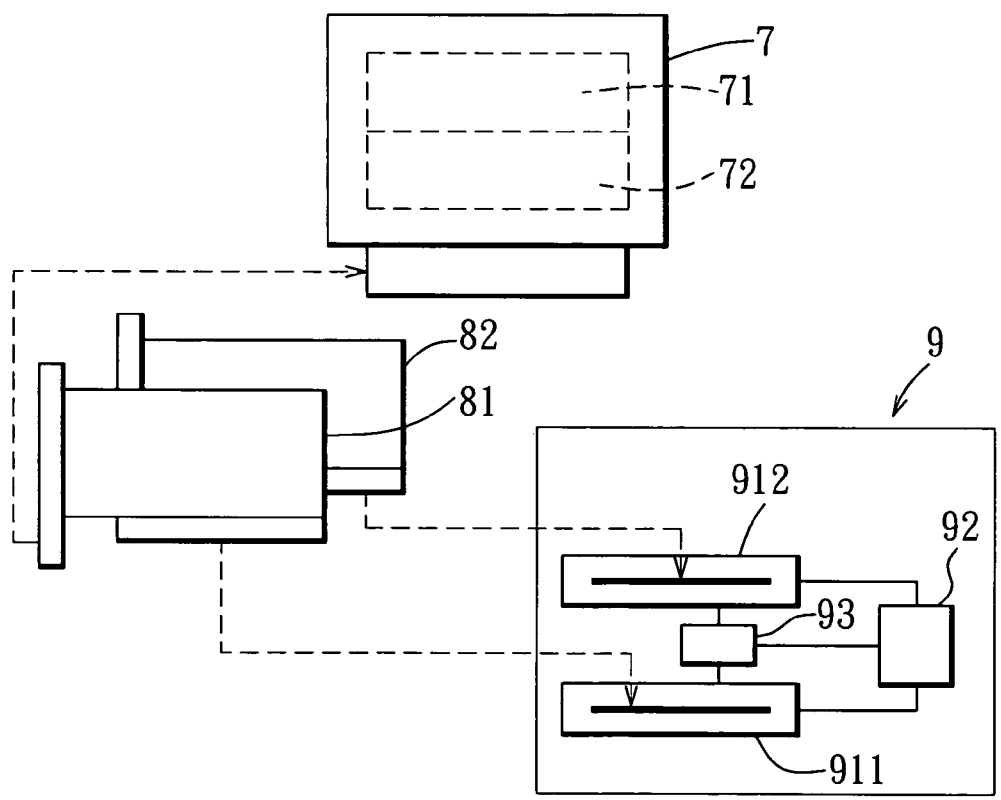
FIG. 1 is a schematic view illustrating how two graphics cards are coupled electrically to a conventional motherboard.

Before the present invention is described in greater detail, it should be noted that like elements are denoted by the same reference numerals throughout the disclosure.

Figure 2:
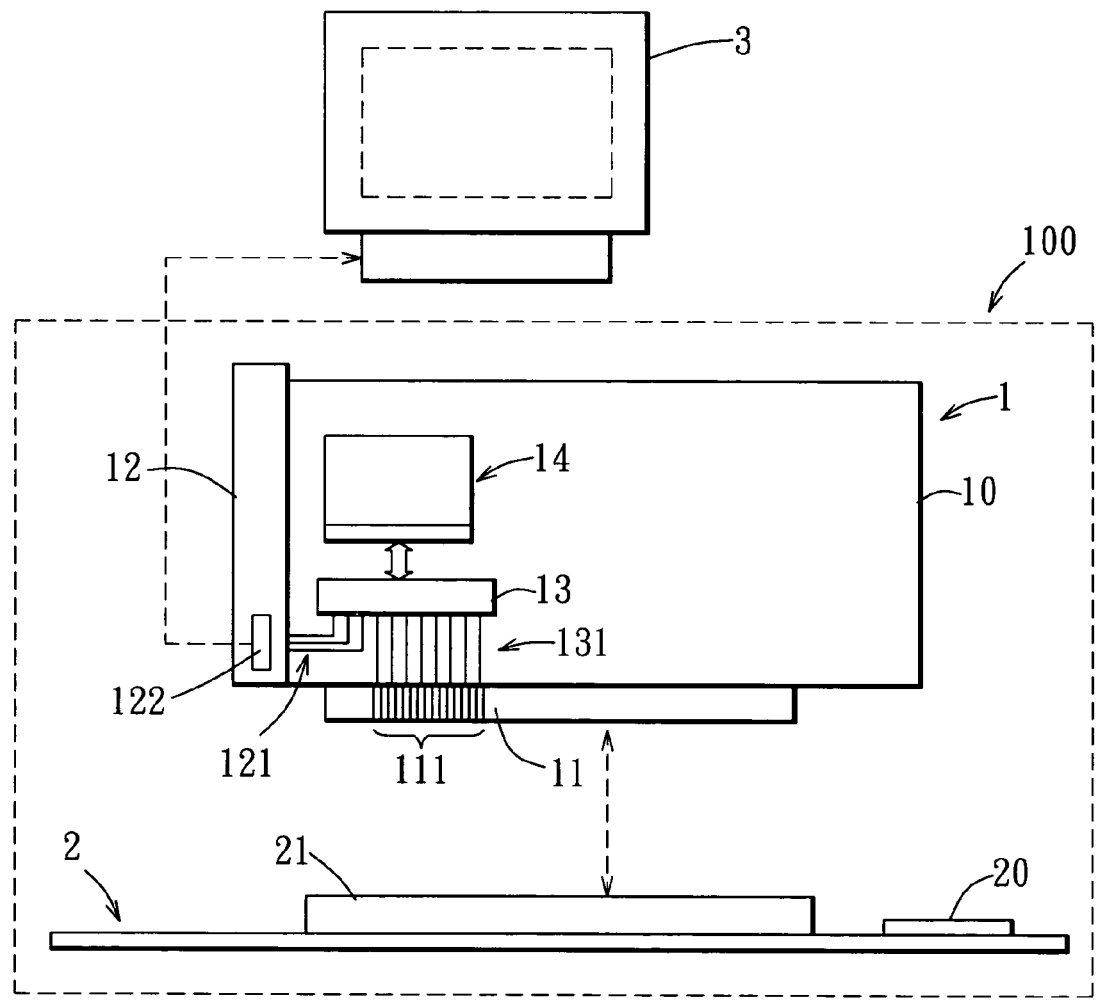
FIG. 2 is a schematic view showing the first preferred embodiment of a motherboard device according to the present invention.

Referring to FIG. 2, the first preferred embodiment of a motherboard device 100 according to the present invention is shown to include a circuit board 2, a primary slot 21, a processing unit 20, and a graphics card connector module 1. In this embodiment, the motherboard device 100 is adapted for use with a graphics card 14.

The primary slot 21 is mounted on the circuit board 2, and provides signal coupling compatible with the PCI-Express industry standard. The primary slot 21 provides signal coupling over N channels, where N can be one of 2, 4, 8, 16 and 32.

The processing unit 20 is mounted on the circuit board 2, and is connected electrically to the primary slot 21.

The graphics card connector module 1 includes a card body 10, a first coupling connector 11, a graphics card connector 13, and a second coupling connector 12.

The first coupling connector 11 is mounted on the card body 10, and is coupled electrically to the primary slot 21. The first coupling connector 11 has a plurality of conductive terminals 111, each of which is coupled electrically to a corresponding one of the channels of the primary slot 21. The number of the conductive terminals 111 of the first coupling connector 11 is not greater than N.

The graphics card connector 13 is mounted on the card body 10, is connected electrically to the first coupling connector 11 by electrical wires 131, and is adapted to be coupled electrically to the graphics card 14. In this embodiment, the graphics card connector 13 provides a signal coupling compatible with the Mobile PCI-Express Module (MXM) format.

The second coupling connector 12 is mounted on the card body 10, is connected electrically to the graphics card connector 13 by electrical wires 121, and is adapted to be connected electrically to a display device 3. In this embodiment, the second coupling connector 12 includes an output port unit 122 adapted to be connected electrically and wiredly to the display device 3. The output port unit 122 is adapted for transmission of a selected one of VGA, TV and DVI signals from the graphics card 14 therethrough when the graphics card connector 13 is coupled electrically to the graphics card 14.

In such a configuration, when the graphics card 14 is coupled electrically to the graphics card connector 13, the processing unit 20 is configured to supply data to the graphics card 14 via the primary slot 21, and the first coupling connector 11 and the graphics card connector 13 of the graphics card connector module 1 for processing the data. The data processed by the graphics card 14 is outputted to the display device 3 via the graphics card connector 13 and the second coupling connector 12 of the graphics card connector module 1.

Figure 3:
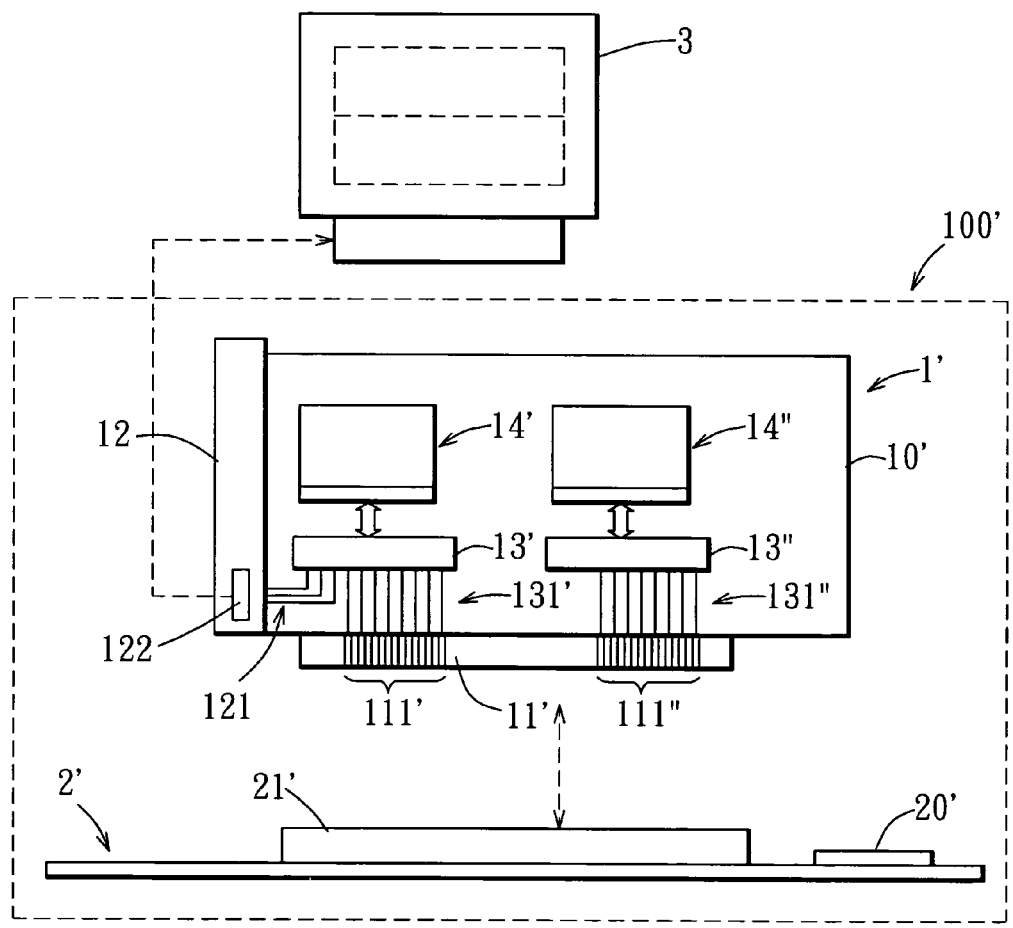
FIG. 3 is a schematic view showing the second preferred embodiment of a motherboard device according to the present invention.

Referring to FIG. 3, the second preferred embodiment of a motherboard device 100' according to the present invention supports the SLI standard and is shown to include a circuit board 2', a primary slot 21', a processing unit 20', and a graphics card connector module 1'. In this embodiment, the motherboard device 100' is adapted for use with first and second graphics cards 14', 14".

The primary slot 21' is mounted on the circuit board 2', and provides signal coupling compatible with the PCI-Express industry standard. The primary slot 21' provides signal coupling over N channels, such as 16 channels (channels 0~15).

The processing unit 20' is mounted on the circuit board 2', and is connected electrically to the primary slot 21'.

The graphics card connector module 1'includes a card body 10', a first coupling connector 11', a master graphics card connector 13', a slave graphics card connector 13", and a second coupling connector 12.

The first coupling connector 11' is mounted on the card body 10', and is coupled electrically to the primary slot 21'. The first coupling connector 11' has a plurality of conductive terminals 111', 111". In this embodiment, the number of the conductive terminals 111', 111" of the first coupling connector 11' is equal to N, where the number of the conductive terminals 111' is equal to N/2, and the number of the conductive terminals 111" is equal to N/2. Each of the conductive terminals 111' is coupled electrically to a corresponding one of the channels, such as the channels 0~7, of the primary slot 21'. Each of the conductive terminals 111" is coupled electrically to a corresponding one of the channels, such as the channels 8~15, of the primary slot 21'.

The master graphics card connector 13' is mounted on the card body 10', is connected electrically to the conductive terminals 111' of the first coupling connector 11' by electrical wires 131', and is adapted to be coupled electrically to the first graphics card 14'. In this embodiment, the master graphics card connector 13' provides a signal coupling compatible with the Mobile PCI-Express Module (MXM) format.

The slave graphics card connector 13" is mounted on the card body 10', is connected electrically to the conductive terminals 111" of the first coupling connector 11' by electrical wires 131", and is adapted to be coupled electrically to the second graphics card 14". In this embodiment, the slave graphics card connector 13" provides a signal coupling compatible with the Mobile PCI-Express Module (MXM) format.

The second coupling connector 12 is mounted on the card body 10', is connected electrically to the master graphics card connector 13' by electrical wires 121, and is adapted to be connected electrically to a display device 3. In this embodiment, the second coupling connector 12 includes an output port unit 122 adapted to be connected electrically and wiredly to the display device 3. The output port unit 122 is adapted for transmission of a selected one of VGA, TV and DVI signals from the first and second graphics cards 14' and 14" therethrough when the master and slave graphics card connectors 13', 13" are coupled electrically and respectively to the first and second graphics cards 14', 14".

In such a configuration, when the first and second graphics cards 14', 14" are coupled electrically to the master and slave graphics card connectors 13', 13", the processing unit 20' is configured to supply data to the first and second graphics cards 14', 14" via the primary slot 21', and the first coupling connector 11' and the master and slave graphics card connectors 13', 13" of the graphics card connector module 1' for processing the data. The data processed by the first and second graphics cards 14', 14" is outputted to the display device 3 via the master graphics card connector 13' and the second coupling connector 12 of the graphics card connector module 1'.

In sum, due to the presence of the graphics card connector module 1, 1', the motherboard device 100, 100' of the present invention for a desktop computer is adapted for use with one of more graphics cards compatible with the MXM format using a single PCI-Express primary slot 21.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. A graphics card connector module adapted for interconnecting a motherboard, a graphics card and a display device, the motherboard including a primary slot that provides signal coupling compatible with the PCI-Express industry standard and coupling over N channels, said graphics card connector module comprising:
   a card body;
   a first coupling connector mounted on said card body and adapted to be coupled electrically to the primary slot of the motherboard;
   a graphics card connector mounted on said card body, connected electrically to said first coupling connector, and adapted to be coupled electrically to the graphics card; and
   a second coupling connector mounted on said card body, connected electrically to said graphics card connector, and adapted to be connected electrically to the display device;
   wherein said first coupling connector has a plurality of conductive terminals, each of which is adapted to be electrically coupled to a corresponding one of the channels of the primary slot, the number of said conductive terminals of said first coupling connector being not greater than N.

2. The graphics card connector module as claimed in claim 1, wherein said graphics card connector provides signal coupling compatible with the Mobile PCI-Express Module (MXM) format.

3. A graphics card connector module adapted for interconnecting a motherboard, a graphics card and a display device, the motherboard including a primary slot that provides signal coupling compatible with the PCI-Express industry standard, said graphics card connector module comprising:
   a card body;
   a first coupling connector mounted on said card body and adapted to be coupled electrically to the primary slot of the motherboard;
   a graphics card connector mounted on said card body, connected electrically to said first coupling connector, and adapted to be coupled electrically to the graphics card; and a second coupling connector mounted on said card body, connected electrically to said graphics card connector, and adapted to be connected electrically to the display device;

wherein said second coupling connector includes an output port unit adapted to be connected electrically and physically to the display device; and wherein said output port unit is adapted for transmission of a selected one of VGA, TV and DVI signals from the graphics card therethrough when said graphics card connector is coupled electrically to the graphics card.

4. A graphics card connector module adapted for interconnecting a motherboard, first and second graphics cards and a display device, the motherboard including a primary slot that provides signal coupling compatible with the PCI-Express industry standard, said graphics card connector module comprising:

a card body;

a first coupling connector mounted on said card body and adapted to be coupled electrically to the primary slot of the motherboard;

a master graphics card connector mounted on said card body, connected electrically to said first coupling connector, and adapted to be coupled electrically to the first graphics card;

a slave graphics card connector mounted on said card body, connected electrically to said first coupling connector, and adapted to be coupled electrically to the second graphics card; and a second coupling connector mounted on said card body, connected electrically to said master graphics card connector, and adapted to be connected electrically to the display device.

5. The graphics card connector module as claimed in claim 4, the primary slot providing signal coupling over N channels, wherein said first coupling connector has a plurality of conductive terminals, each of which is adapted to be electrically coupled to a corresponding one of the channels of the primary slot, the number of said conductive terminals of said first coupling connector being equal to N.

6. The graphics card connector module as claimed in claim 5, wherein N/2 of said conductive terminals of said first coupling connector are connected electrically to said master graphics card connector, and the remaining N/2 of said conductive terminals of said first coupling connector are connected electrically to said slave graphics card connector.

7. The graphics card connector module as claimed in claim 4, wherein each of said master and slave graphics card connectors provides signal coupling compatible with the Mobile PCI-Express Module (MXM) format.

8. The graphics card connector module as claimed in claim 4, wherein said second coupling connector includes an output port unit adapted to be connected electrically and physically to the display device.

9. The graphics card connector module as claimed in claim 8, wherein said output port unit is adapted for transmission of a selected one of VGA, TV and DVI signals from the first and second graphics cards therethrough when said master and slave graphics card connectors are coupled electrically and respectively to the first and second graphics cards.

10. A motherboard device comprising:

a circuit board;

a primary slot mounted on said circuit board and providing signal coupling compatible with the PCI-Express industry standard;

a processing unit mounted on said circuit board and connected electrically to said primary slot; and a graphics card connector module including a card body, a first coupling connector mounted on said card body and coupled electrically to said primary slot, a graphics card connector mounted on said card body, connected electrically to said first coupling connector, and adapted to be coupled electrically to a graphics card, and a second coupling connector mounted on said card body, connected electrically to said graphics card connector, and adapted to be connected electrically to a display device;

wherein, when the graphics card is coupled electrically to said graphics card connector, said processing unit is configured to supply data to the graphics card via said primary slot, and said first coupling connector and said graphics card connector of said graphics card connector module for processing the data, the data processed by the graphics card being outputted to the display device via said graphics card connector and said second coupling connector of said graphics card connector module.

11. The motherboard device as claimed in claim 10, wherein said primary slot provides signal coupling over 2, 4, 8, 16 or 32 channels.

12. The motherboard device as claimed in claim 10, wherein said primary slot provides signal coupling over N channels, said first coupling connector of said graphics card connector module having a plurality of conductive terminals, each of which is coupled electrically to a corresponding one of said channels of said primary slot, the number of said conductive terminals of said first coupling connector being not greater than N.

13. The motherboard device as claimed in claim 10, wherein said graphics card connector provides signal coupling compatible with the Mobile PCI-Express Module (MXM) format.

14. The motherboard device as claimed in claim 10, wherein said second coupling connector includes an output port unit adapted to be connected electrically and physically to the display device.

15. The motherboard device as claimed in claim 14, wherein said output port unit is adapted for transmission of a selected one of VGA, TV and DVI signals from the graphics card therethrough when said graphics card connector is coupled electrically to the graphics card.

16. A motherboard device comprising:

a circuit board;

a primary slot mounted on said circuit board and providing signal coupling compatible with the PCI-Express industry standard;

a processing unit mounted on said circuit board and connected electrically to said primary slot; and a graphics card connector module including a card body, a first coupling connector mounted on said card body and coupled electrically to said primary slot, a master graphics card connector mounted on said card body, connected electrically to said first coupling connector, and adapted to be coupled electrically to a first graphics card, a slave graphics card connector mounted on said card body, connected electrically to said first coupling connector, and adapted to be coupled electrically to a second graphics card, and a second coupling connector mounted on said card body, connected electrically to said master graphics card connector, and adapted to be connected electrically to a display device;

wherein, when the first and second graphics cards are coupled electrically and respectively to said master and slave graphics card connectors, said processing unit is configured to supply data to the first and second graphics cards via said primary slot, and said first coupling connector and said master and slave graphics card connectors of said graphics card connector module for processing the data, the data processed respectively by the first and second graphics cards being outputted to the display device via said master graphics card connector and said second coupling connector of said graphics card connector module.

17. The motherboard device as claimed in claim 16, wherein said primary slot provides signal coupling over 2, 4, 8, 16 or 32 channels.

18. The motherboard device as claimed in claim 16, wherein said primary slot provides signal coupling over N channels, said first coupling connector of said graphics card connector module having a plurality of conductive terminals, each of which is coupled electrically to a corresponding one of said channels of said primary slot, the number of said conductive terminals of said first coupling connector being equal to N.

19. The motherboard device as claimed in claim 18, wherein N/2 of said conductive terminals of said first coupling connector are connected electrically to said master graphics card connector, and the remaining N/2 of said conductive terminals of said first coupling connector are connected electrically to said slave graphics card connector.

20. The motherboard device as claimed in claim 16, wherein each of said master and slave graphics card connectors provides signal coupling compatible with the Mobile PCI-Express Module (MXM) format.

21. The motherboard device as claimed in claim 16, wherein said second coupling connector includes an output port unit adapted to be connected electrically and physically to the display device.

22. The motherboard device as claimed in claim 21, wherein said output port unit is adapted for transmission of a selected one of VGA, TV and DVI signals from the first and second graphics cards therethrough when said master and slave graphics cards connectors are coupled electrically and respectively to the first and second graphics cards.

* * * * *